(12) United States Patent
Udall

(10) Patent No.: US 7,845,158 B2
(45) Date of Patent: Dec. 7, 2010

(54) TURBINE ENGINE MOUNTING ARRANGEMENT

(75) Inventor: Kenneth F. Udall, Derby (GB)

(73) Assignee: Rolls-Royce PLC, London (GB)

( * ) Notice: Subject to any disclaimer, the term of this patent is extended or adjusted under 35 U.S.C. 154(b) by 694 days.

(21) Appl. No.: 11/976,543

(22) Filed: Oct. 25, 2007

(65) Prior Publication Data

US 2008/0135679 A1 Jun. 12, 2008

(30) Foreign Application Priority Data

Nov. 10, 2006 (GB) .................................. 0622405.9

(51) Int. Cl.
*F02K 3/02* (2006.01)
(52) U.S. Cl. ........................................ 60/226.1; 60/796
(58) Field of Classification Search ................. 60/226.1, 60/262, 796, 797; 415/211.2; 244/54; 248/554
See application file for complete search history.

(56) References Cited

U.S. PATENT DOCUMENTS

| 3,540,682 | A | 11/1970 | Dibble et al. |
| 5,746,391 | A | 5/1998 | Rodgers et al. |
| 6,195,983 | B1 | 3/2001 | Wadia et al. |

2005/0274485 A1 12/2005 Huggins et al.

FOREIGN PATENT DOCUMENTS

| EP | 0 787 895 A3 | 8/1997 |
| EP | 1 627 812 A2 | 2/2006 |
| GB | 1 428 091 | 3/1976 |
| GB | 1 506 952 | 4/1978 |
| GB | 2 275 308 A | 8/1994 |
| WO | WO 2006/090031 A1 | 8/2006 |

OTHER PUBLICATIONS

Envia, E. et al., "Design Selection and Analysis of a Swept and Leaned Stator Concept," Journal of Sound and Vibration, 1999, pp. 793-836, vol. 228-No. 4.
European Search Report issued in European Application No. EP 07 25 4213, mailed Nov. 20, 2009.

*Primary Examiner*—Michael Cuff
*Assistant Examiner*—Craig Kim
(74) *Attorney, Agent, or Firm*—Oliff & Berridge, PLC

(57) ABSTRACT

An engine mounting arrangement is provided in which a mounting structure is created through fins (21, 42) extended between a core (22, 46) and a mounting ring (23, 48). The fins (21, 42) have a tangential lean and substantive planar aspect in order to create an appropriate load transfer path for torque and thrust loads in an engine when secured upon a hanger mounting (20) and through utilizing further struts (25, 26) extending from spaced locations upon the mounting structure to rearward anchor positions on a pylon (27) which also has the hanger mounting (20) attached.

9 Claims, 4 Drawing Sheets

TURBINE ENGINE MOUNTING ARRANGEMENT

The present invention relates to turbine engine mounting arrangements and in particular arrangements to secure a gas turbine engine to a wing pylon of an aircraft.

There is a requirement to secure gas turbine engines to the wing of an aircraft in order to provide propulsion. FIG. 1 is marked "Prior Art" and illustrates a typical engine mounting arrangement as a schematic perspective of a half cross-section utilised with regard to a gas turbine engine for aircraft propulsion. Thrust from the engine results in propulsion in the direction of arrowhead 1. This propulsion is a result of accelerated airflow through the engine in the direction of arrowhead 2. As can be seen, the engine is secured upon a front mounting 3 and a rear mounting 4 to a pylon (not shown, but well known). Within the gas turbine engine the LP turbine imparts torque to a propulsive fan 41 which is transferred to an annular array of outlet guide vanes 70 (OGV) that connect between an engine core casing 72 and an outer fan casing 14. This torque then passes back along the core casing 72 to the LP turbine stators. Intake side load 10 is reacted by front mount load 11, offset from the engine centre-line to give torque 5 which is balanced by rear torque reaction 6. Side load reaction 12 gives yaw balance. Intake upload 7 causes front mount vertical reaction 8 and rear mount vertical reaction 9. It is a necessary function of the mountings 3, 4 to support an engine 13 in use against these external loads 1, 7, 10 as well as carrying the weight of the engine under vertical, side, axial, pitch yaw and roll accelerations. Two A-frames 15A, only one of which can be seen, are positioned at opposite side of the engine and span between the rear 14A of the fan case 14 and the core casing 72. As can be seen A-frame loads are presented as a tensile load 18 and a compressive load 19.

It will be noted that the mountings 3, 4 are generally spaced along the pylon which itself is secured to an aircraft wing. At the rear of the fan casing 14 is a stiffener ring 14A that provides a transfer for the point loads 18, 19 from the A-frame apex 15 into the fan case, and controls the circularity of the fan case. In such circumstances, externally to the engine 13 structure, a couple is transferred to the pylon by front mount reactions 8, 11 acting about the rear mount 4 plane, separated by an engine mounting span, that is to say the distance between the mountings 3, 4. It will be understood that the rear mount reactions 9, 12 bend the core of the engine 13. These and other load transfer effects within the engine are disadvantageous, for example, to blade tip clearances in compressor and turbine rotors.

To improve noise and performance of gas turbine engines, the industry trend is towards larger propulsive fan diameters and it will be understood engine placement under a wing becomes more difficult due to the limited space between ground and wing. To accommodate a larger engine, a separate jets configuration allows the engine to be mounted further forward and higher up, with the cold nozzle in line with the wing leading edge or forward of it. This increases the pylon length and the wing twisting moment. It is therefore desirable to minimise engine length and therefore imposed loads. However, the jet pipe, thrust reverser, rear fan case, guide vanes and fan rear gap length set the position of the fan and of the whole engine relative to the wing.

The present invention eliminates the rear fan case 14, allowing the engine's nacelle 74 (only an intake part of which is shown) to be shortened, and hence the engine to be moved aft, closer to the wing.

In accordance with aspects of the present invention there is provided a turbine engine having a mounting arrangement for connection to a mounting pylon, the engine comprising a mounting structure secured below the mounting pylon, the mounting structure comprising a plurality of fins between a engine core and a mounting ring, the arrangement characterised in that the fins have a substantive planar aspect and lean with the direction of torque imposed upon the mounting arrangement by rotation of the engine in use and the arrangement includes struts extending between association with the mounting ring and respective anchor positions on the pylon axially displaced from the mounting structure.

Preferably, the fins are outlet guide vanes for a gas turbine engine.

Preferably, the mounting structure is secured to the mounting pylon through a hanger mounting to act as a first anchor strut to act against vertical, side and thrust loading upon the arrangement in use. Typically, the hanger mounting is substantially at top dead centre (TDC) for the arrangement.

Preferably, the anchor positions for the struts act as further anchors for the arrangement to define at least one three point mounting relationship.

Preferably, the struts extend to the anchor positions upon the mounting structure at about 120° from top dead centre spacing from each other and top dead centre of the arrangement.

Preferably, the struts are secured to the mounting ring.

Preferably, the arrangement is associated with an inner duct wall and each strut is substantially perpendicular to the inner wall but oblique to a flow in use passing over the inner duct wall.

Optionally, the fins have a swept back leading edge with an extended trailing edge to ensure a planar aspect to the fins in use.

Also in accordance with the present invention there is provided a gas turbine engine including a mounting arrangement as described above.

Typically the engine includes a separate displaceable casing over a cascade of shutters to facilitate reverse thrust in use.

Possibly the casing includes a deflector.

An embodiment of the present invention will now be described by way of example only with reference to the accompanying drawings in which.

Figure 3A:
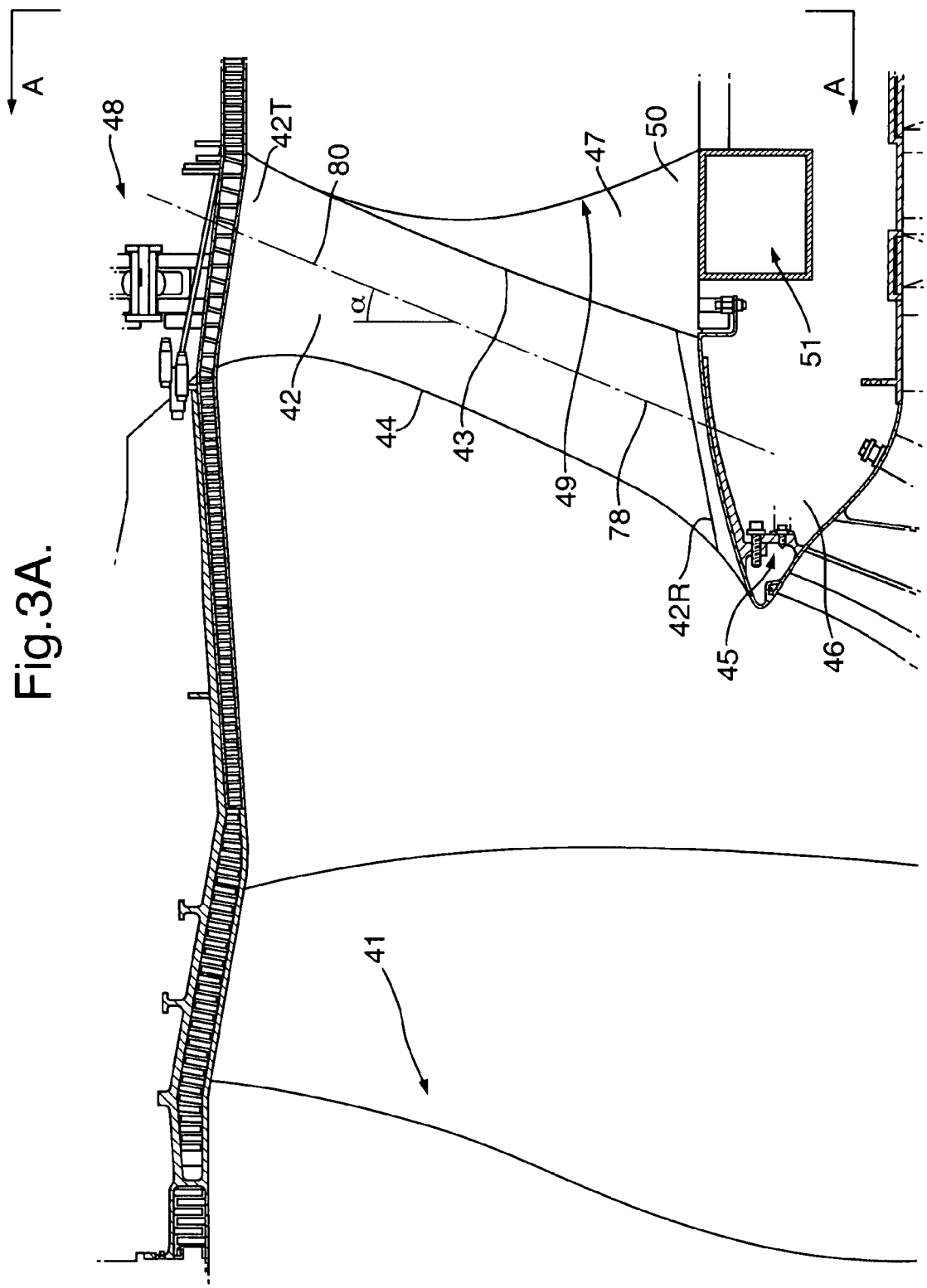
Figure 3B:
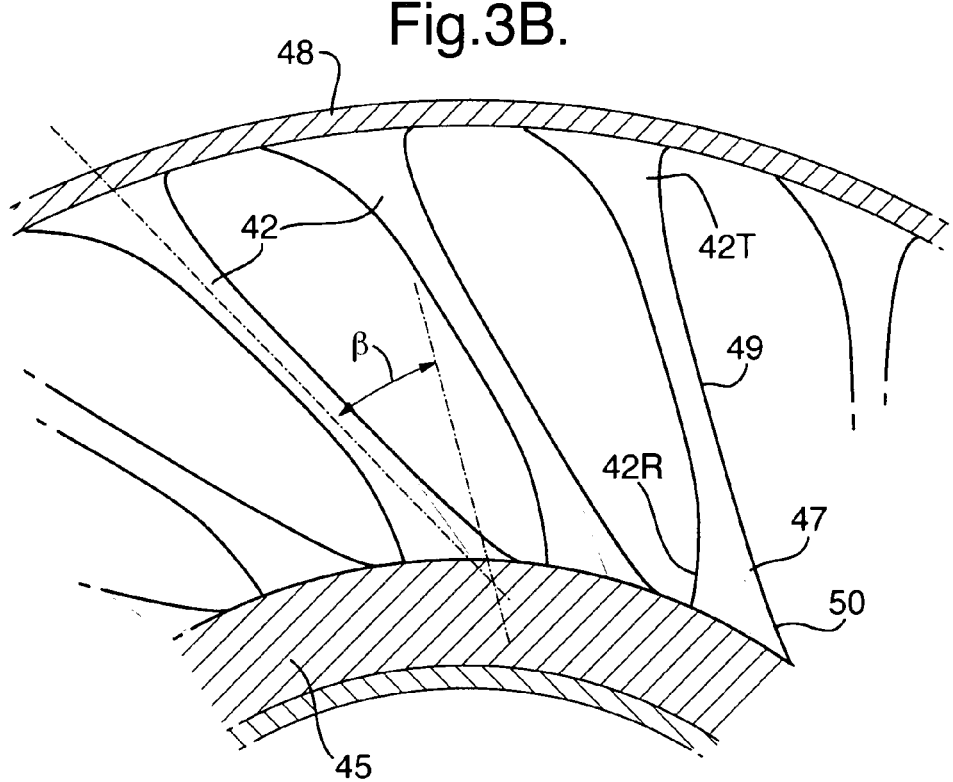
Figure 4:
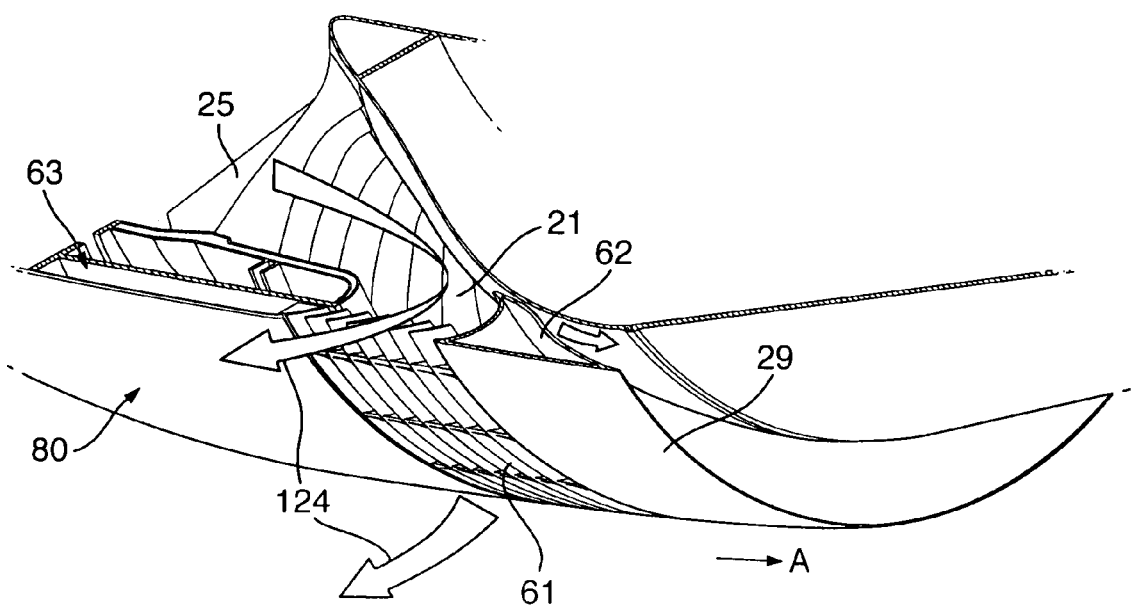

FIG. 3A is a part cross-section of a front edge swept fin and showing the fin having an optional axial lean in accordance with aspects of the present invention; and FIG. 3B is a section AA in FIG. 3A and shows the fin having a tangential lean in accordance with aspects of the present invention; and FIG. 4 is a schematic rear perspective view of a reverse thruster associated with a mounting arrangement in accordance with aspects of the present invention.

In order to shorten engine length, aspects of the present invention separate the tasks performed by the rear fan case and A-frame structure shown in the prior art into the roll torque fan case to core transfer function (performed by planar leaning of the OGVs at an optimum angle between the core 72 and the front mounting ring 23 or frame about the engine giving rim-hub hoop fight), the pitch couple function (performed by aft load in the top mount, opposed by tension of the lower struts 25, 26) and the yaw couple function through one strut 25 being in tension and the other 26 in compression. The roll couple is transferred to the core but intake pitch and yaw couples are passed directly to the pylon by an arrangement in accordance with aspects of the present invention and depicted in FIG. 2.

Figure 1:
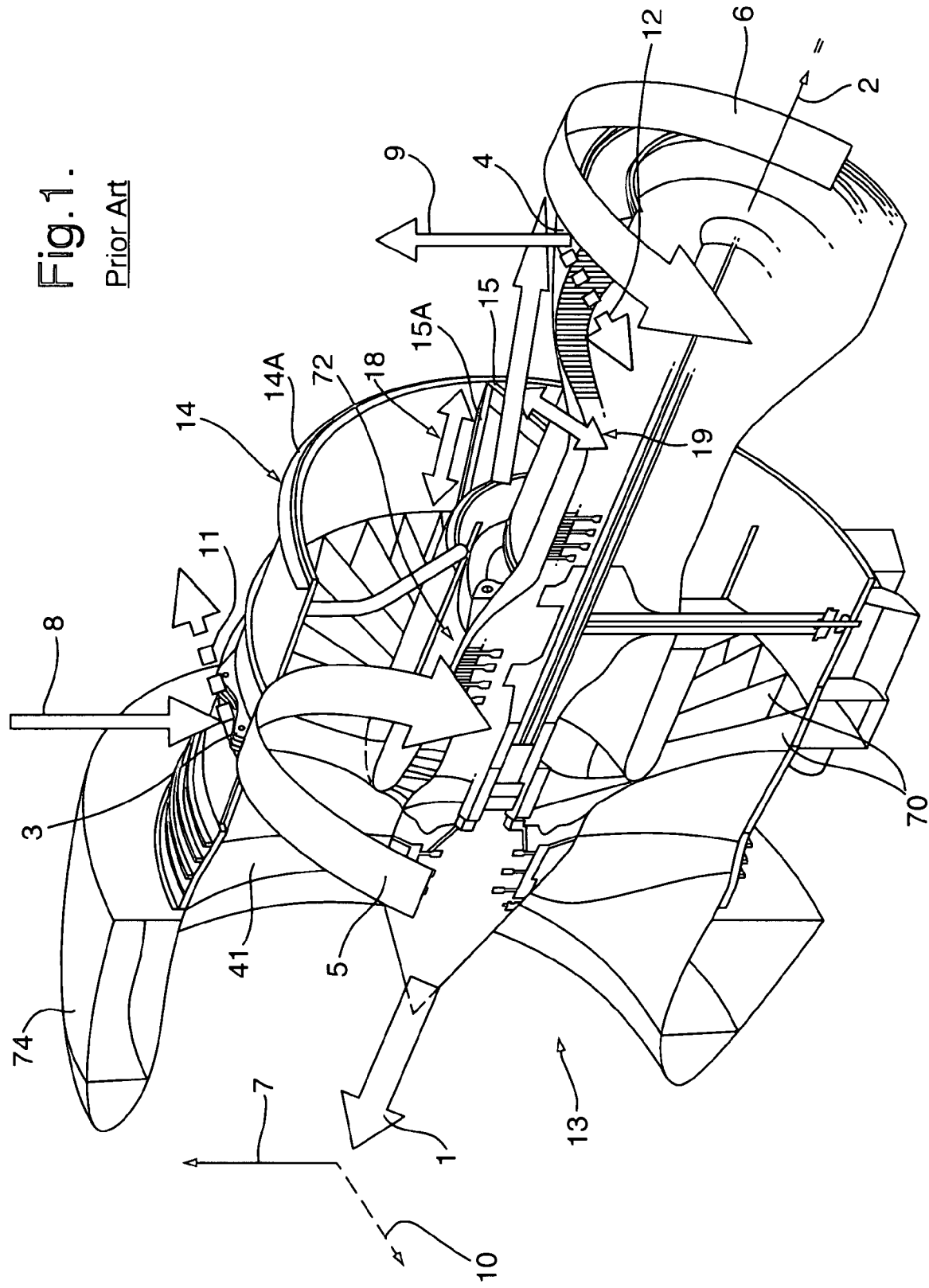
FIG. 1 is a schematic part rear perspective view of a prior art engine mounting arrangement.
Figure 2:
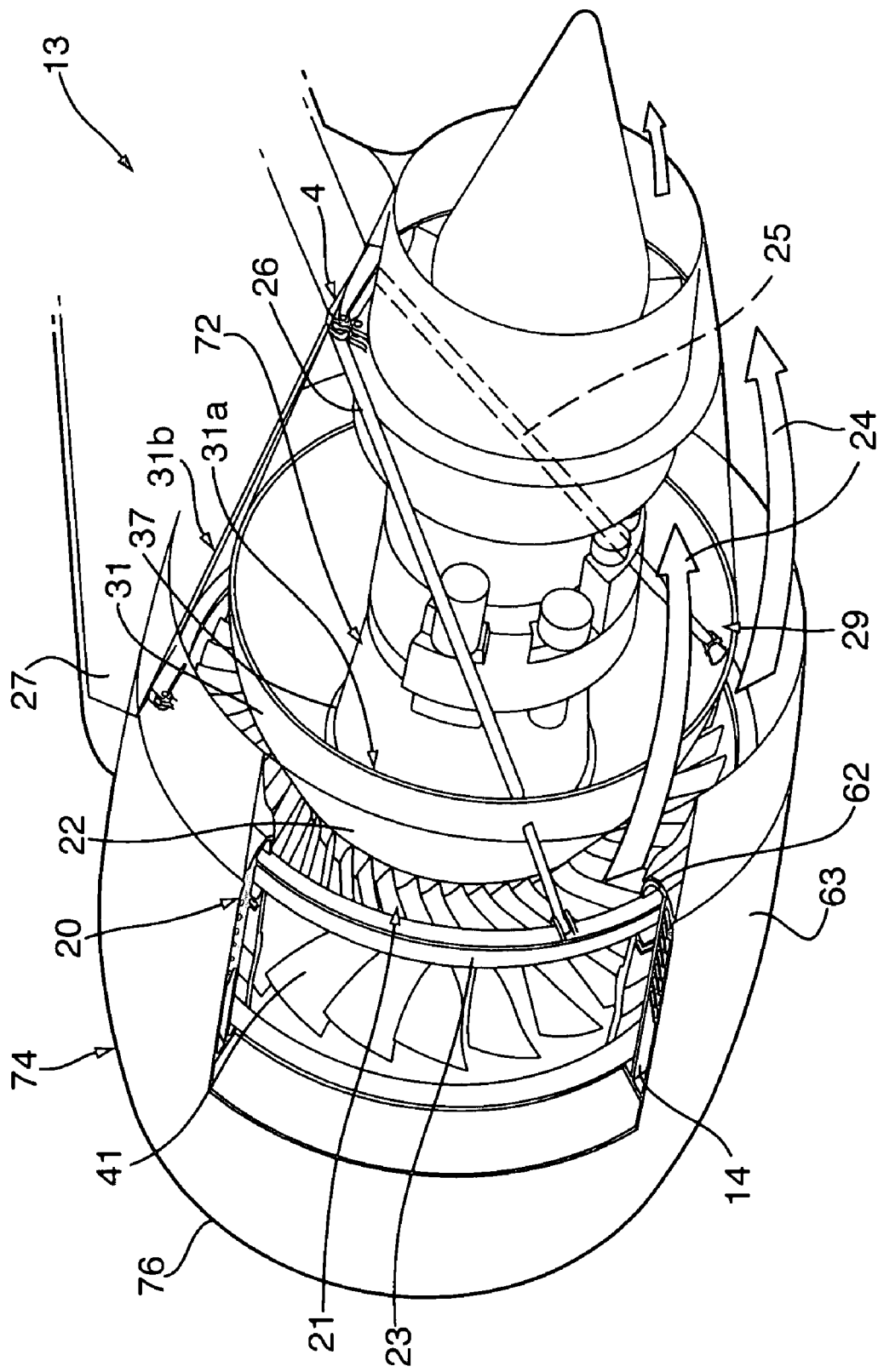
FIG. 2 is a schematic part rear perspective view of an engine mounting arrangement in accordance with aspects of the present invention.

Planar leaning is the rotation of the radially inner ends of the outlet guide vanes 21, relative their outer ends, in a clockwise direction as viewed in FIG. 2 so that the OGVs have both a tangential and radial extent.

As can be seen in FIG. 2, a front hanger mounting 20 secures a mounting structure comprising outlet guide vanes or fins 21 between a core 22 and a mounting ring 23. These fins 21 are of a generally conventional configuration comprising leading and trailing edges with pressure and suction surfaces therebetween and have a planar aspect. The fins 21 lean tangentially at an angle chosen to give the necessary rim-hub hoop fight or conflict to resist torque and therefore create a robust mounting arrangement in accordance with aspects of the present invention. These fins 21 or outlet guide vanes straighten the flow of air from the propulsive fan before the air passes out of the exhaust nozzle at the rear part of the nacelle.

Struts 25, 26 extend between the mounting ring 23 and the pylon 27, and control the pitch couple and the yaw couple within the engine. These struts 25, 26 are nominally attached to the mounting ring 23 at positions plus and minus 120° from a top dead centre (TDC) of the engine. In such circumstances, roll couple as indicated by arrow 5 is still transferred to the core through the robust relationship of the fins 21 in the mounting arrangement comprising those fins associated across the core 22 and the mounting ring 23 itself secured through the hanger mounting 20 to a pylon 27. Loads induced by air entering the intake 76 portion of the nacelle 74 are in the form of pitch and yaw couples, which are passed directly to the pylon 27 through the struts 25, 26 in compression and tension for the yaw couple and together act in tension against hanger mounting 20 in compression for the pitch couple.

Thrust loads are taken at the hanger mounting 20 in a normal way, but shared with of the struts, 25, 26 at appropriate spacings around the mounting ring 23 and it will be understood that this gives a three load-point arrangement which permits even loading. Furthermore, it will also be understood that such an arrangement in accordance with aspects of the present invention balances thrust loads about the engine centre-line and thus minimises thrust induced pitch couple about the centre-line, giving low distortion across the engine and particularly its casings 14, 72. This arrangement can also be enhanced by low strain metal matrix composite (MMC) struts 25, 26 which also benefit critical strut buckling load and tuned flexibility of the hanger mount 20 axial restraint to give a balanced mounting arrangement. Other low strain materials may also be used for the struts 25, 26.

By the arrangement of the present invention it will be appreciated that the prior art rear fan case 14 and its associated length is eliminated, as are the prior art A-frames. It is therefore possible to bring forward the thrust reverser and jet pipe, both incorporated in the nacelle 74, to give a more compact installation with reduced pylon and wing bending moments. Furthermore, an alternative more compact thrust reverser arrangement could be provided with a reverser nozzle achieved through displacement of the translating jet pipe 62 in order to deploy reverser cascades (airflow turning vanes) from a stowed position over the containment case as will be described later with regard to FIG. 4. These cascades enhance fan blade off containment capability at the high rotational speeds during take off and climb, and are deployed away from the containment function during the reverse thrust manoeuvre, which is at a lower fan speed, and needs less containment capability. Another compact thrust reverser is described in the Applicant's copending application GB0611963.0 and which is incorporated by reference hereto, in which the cascades are eliminated and a nozzle is formed on deployment of the jet pipe 62 by a lower exit scarf angle, with circumferential control by circumferential variation of the outer nacelle split line.

The struts 25, 26 are arranged such that there is minimal exposure of the struts to a bypass flow 24, from the propulsive fan, to reduce aerodynamic losses therefrom. The oblique angle of the struts, crossing this flow minimises local flow blockage and Mach number effects.

It will be understood that the struts pass directly between the mounting ring 23 of the fan case 14 to the pylon 27 for an efficient load path.

The hanger mounting 20 as indicated is generally at the front of the mounting arrangement in accordance with aspects of the present invention and generally takes vertical, side and thrust forces generated by the engine 13 in use. This hanger mounting 20 can be considered a first strut in accordance with the three point axial loading restraint of the present invention. The second and third struts also act as load restraints by securing the fan casing 14 and in particular the mounting ring 23 to the pylon 27 as described above. The struts or links 25 and 26 are fixed to the pylon 27 generally at the port and starboard lower corners at a displaced axial position on the pylon 27 from the hanger mounting 20. Thus, a three point mounting relationship is provided for stability.

It will be noted that the rear cowl 31 is split into half sections with a parting joint line 31a and a sliding or hinging joint line 31b aft of the struts 24, 25 emergence through the fixed cowl to the core 22. Such an arrangement will allow these split aft cowl sections to hinge or slide along joining line 31b to give engine core and accessory space access.

By the above approach it will be appreciated that the engine mounting arrangement in accordance with aspects of the present invention allows relative isolation of intake 76 loads from the engine 13, instead transferring them directly into the pylon 27. This will allow simpler, stiffer, lighter and more efficient load paths within the engine mounting arrangement saving weight overall and therefore improving overall operational efficiency with regard to propulsion of an aircraft. By also minimising core engine 72 bending within the engine it will be appreciated that more accurate control of blade tip clearances can be achieved and this along with other factors will improve fuel efficiency with regard to an engine in operational use.

Reducing or shortening engine and nacelle length will produce a saving with regard to aerodynamic drag, component weight and cost as well as allowing the fan to be placed much closer to the wing leading edge. Furthermore, engine shortening will reduce pylon length and wing attachment forces giving further aircraft cost and weight savings.

Provision of a mounting arrangement in accordance with the stowing cascade aspects of the present invention as indicated above allows a tuned containment system in which the containment capability varies the same direction as the blade speed, with some weight saving. As the stowed thrust reverser structure offers some small additional containment capability at high blade speed, allowing some reduction in the primary containment system.

The present invention also avoids use of prior art thrust struts, whiffletree like structures or load balance beam (as known in the art), simplifying the thrust mounting structure improving cost, weight, reliability and buckling behaviour due to end fixation. Duplex struts, either parallel or coaxial tubes, may be used for fail safe load paths.

It will be understood that there is also a possibility with regard to noise reduction due to the scissoring effect of the fan exit wakes on the tangentially inclined outlet guide vane leading edges. That is, the wake of the flow from the blade meets the OGV at its root first and progresses radially outwardly to the tip, giving an interaction over a short radial height and thus a locally small noise source.

Provision of thrust restraint via struts 25, 26 and mount 20 removes the need for dedicated thrust struts onto the core of the engine, and so reduces congestion over the core of the engine.

It will also be understood a more uniform roll torque application (i.e. the load is shared out by all of the OGVs instead of being concentrated into four A-frame members) to the core will reduce the prior art's A-frame loading that forces the casings into an oval shape, this in turn may improve operational efficiency through less distortion.

FIGS. 3A and 3B illustrate a section of an engine mounting arrangement including the fins 21 and in accordance with aspects of the present invention. As indicated above it is important that the fins 21, in accordance with the present invention, have a significant and greater than conventional planar aspect, i.e. their axial extent. If the outlet guide vanes (OGVs) 21 are structurally axially leaned, then roll torque transfer hub to rim hoop fight then causes a relative axial movement, between the hub and the rim. Its mechanism harms the roll torque stiffness of the concept.

As can be seen in FIG. 3A, a fan blade 41 is arranged upstream of a fin 42 having a swept back root portion 50 indicated by the hatched area 47. The fin 42 is otherwise designed to operate as an outlet guide vane in the conventional sense. In FIG. 3A, this fin 42 axially leans downstream in the plane of the drawing as indicated by angle $\alpha$ between a radial line 78 and a nominal stacking axis or centre-line 80 of the vane 42. The leading edge 44, as can be seen, is swept axially rearwards from a radially inward attachment 45 on the core casing 72 of an engine core structure 46 out to a mount ring 48 on the fan casing 14. A prior art trailing edge 43 is shown in broken line and serves as a comparison. Addition of the swept root 50, designated by the hatching 47, creates a new trailing edge 49 with an extended root region 50 connecting to a deep, stiff hoop ring 51. This makes the fin 42 planar (as in a radial line joining the centre of gravity of each OGV radial section moving out from the root to the tip, in FIG. 3A) in a structural sense whilst retaining the axial lean desirable for and in an aerodynamic sense. It will be noted that the hoop ring 51 in conjunction with the existing front attachment 45 gives a broad based stiff hub under the mount ring 48 so that roll torque passing through tangentially inclined fin 42 is restrained by opposing tension and compression in mount ring 48 acting against core structure 46.

In FIG. 3B, the vane or fin 42 is also leaned at a tangential angle $\beta$, i.e. the angle of the tip 42T out of the paper relative to the root 42R. This tangential angle depends upon operational requirements and the characteristics of each engine type in terms of load and torque force rationalisation. The positioning of the fins 21 in terms of axial and tangential lean as well as positioning of the struts will be chosen to ensure that the engine remains operational over a full range of operational conditions in terms of thrust values and torque loadings, etc.

By use of an engine mounting arrangement in accordance with aspects of the present invention it will be understood that a further advantage is provided in that reverse thrust cascades can be provided which are stowed over the fan casing in normal thrust bands. FIG. 4 illustrates a thrust reverser 80 in accordance with aspects of the present invention in a deployed condition. This deployed condition should be compared with that illustrated in FIG. 2 where the thrust reverser is shown in a stowed condition.

As can be seen in FIG. 4, a reverse thrust flow 124 is achieved through a reverse cascade 61 and a deflector 62 which will act to reverse the flow 24 depicted in FIG. 2 in order to create the reverse thrust 124.

Deployment is achieved by movement in the direction of arrowhead A such that the rear nacelle portion 29 is displaced to draw the reverser cascade 61 from location over the fan case in a sleeve 63. This displacement in the direction of arrowhead A and return can be achieved through any appropriate actuator mechanism.

As can be seen in FIG. 2, in the stowed state the reverser cascades 61 are fully located within the fan case sleeve 63 with the deflector 62 abutting and generally creating an effective seal against a rear part of that fan casing 63 for normal forward thrust 24 when flow rates and speeds are higher. As stated before, containment ability is thereby enhanced for the higher speeds.

In such circumstances by use of an engine mounting arrangement in accordance with aspects of the present invention as described above it is possible to provide the reverse thrusters closer to the fan blades 41 and therefore achieve adequate reverse thrust efficiency with a shorter engine installation length.

Alterations and modifications to the above embodiments of the present invention will be understood by those skilled in the art. Thus, for example, it is most convenient to use two struts 25, 26 but in some circumstances it may be more appropriate to use more struts at different spacings about the engine.

I claim:

1. A turbine engine having a mounting arrangement for connection to a mounting pylon, the engine comprising a mounting structure secured below the mounting pylon, the mounting structure comprising a plurality of fins between a engine core and a mounting ring, the arrangement characterised in that the fins lean with the direction of torque imposed upon the mounting arrangement by rotation of the engine in use and the arrangement includes struts extending between the mounting ring and respective anchor positions on the pylon axially displaced from the mounting structure.

2. A turbine engine as claimed in claim 1 wherein the fins are outlet guide vanes for a gas turbine engine.

3. A turbine engine as claimed in claim 1 wherein the mounting structure is secured to the mounting pylon through a hanger mounting to act as a first anchor strut to act against vertical, side and thrust loading upon the arrangement in use.

4. A turbine engine as claimed in claim 3 wherein the hanger mounting is substantially at top dead centre for the arrangement.

5. A turbine engine as claimed in claim 1 wherein the anchor positions for the struts act as further anchors for the arrangement.

6. A turbine engine as claimed in claim 1 wherein the struts extend to the anchor positions upon the mounting structure at about 120° from top dead centre spacing from each other and top dead centre of the arrangement.

7. A turbine engine as claimed in claim 1 wherein the struts are secured to the mounting ring, with a filleted connection to an extended OGV to stiffen against offset load couple.

8. A turbine engine as claimed in claim 1 wherein the arrangement is associated with an inner duct wall and each strut is substantially perpendicular to the inner wall but oblique to a flow in use passing over the inner duct wall.

9. A turbine engine as claimed in claim 1 wherein the fins have a swept back leading edge with an extended trailing edge to ensure a structurally planar aspect to the fins in use.

* * * * *